(12) United States Patent
Jin et al.

(10) Patent No.: US 8,218,677 B2
(45) Date of Patent: Jul. 10, 2012

(54) TRANSMITTER CHARACTERIZATION FOR DIGITAL PRE-DISTORTION USING OFFSET PREAMBLE SUBCARRIERS

(75) Inventors: Hang Jin, Plano, TX (US); John Grabner, Plano, TX (US); Daniel Wee, Garland, TX (US); Bror Peterson, Murphy, TX (US)

(73) Assignee: Cisco Technology, Inc., San Jose, CA (US)

(*) Notice: Subject to any disclaimer, the term of this patent is extended or adjusted under 35 U.S.C. 154(b) by 702 days.

(21) Appl. No.: 12/396,171

(22) Filed: Mar. 2, 2009

(65) Prior Publication Data

US 2010/0220810 A1     Sep. 2, 2010

(51) Int. Cl.
*H04L 25/49* (2006.01)
(52) U.S. Cl. ........ 375/296; 375/260; 375/285; 375/295; 455/63.1; 455/67.13; 455/69; 455/114.3; 330/149
(58) Field of Classification Search .................. 375/260, 375/285, 295, 296; 455/63.1, 67.13, 69, 455/114.3; 330/149
See application file for complete search history.

(56) References Cited

U.S. PATENT DOCUMENTS

| 5,923,214 | A   | * | 7/1999  | Mitzlaff   | 330/52  |
| 6,429,738 | B1  | * | 8/2002  | Kenington  | 330/52  |
| 7,289,575 | B1  | * | 10/2007 | Kenington  | 375/296 |
| 2007/0129027 | A1 |   | 6/2007  | Jin et al. |         |

* cited by examiner

*Primary Examiner* — Leon Flores
(74) *Attorney, Agent, or Firm* — Edell, Shapiro & Finnan, LLC (57) ABSTRACT

Techniques are provided to pre-distort a signal that is transmitted by a transmitter of a wireless communication device, e.g., a device configured for wireless radio frequency communication. The transmitter of the device inherently introduces distortion to the baseband signal to be transmitted. In at least one frame of a baseband signal to be transmitted, at least one subcarrier in a preamble of the frame is shifted in frequency such that the at least one subcarrier is offset from a normal subcarrier frequency position. The at least one frame of the baseband signal is supplied to the transmitter that is configured to produce a transmit signal for transmission. The transmit signal at an output of the transmitter is sampled or detected and inter-modulation distortion in the transmit signal is determined at one or more frequencies as a result of shifting of the frequency of the at least one subcarrier in the preamble of the at least one frame. The baseband signal is pre-distorted based on the inter-modulation distortion prior to coupling to the transmitter for transmission.

21 Claims, 8 Drawing Sheets

TRANSMITTER CHARACTERIZATION FOR DIGITAL PRE-DISTORTION USING OFFSET PREAMBLE SUBCARRIERS

TECHNICAL FIELD

The present disclosure relates to wireless communication devices and systems and more particularly to digital pre-distortion techniques.

BACKGROUND

Digital pre-distortion is an effective technique compensative for the non-linear behavior of a transmitter in a wireless communication device. One important step in digital pre-distortion is characterizing the non-linearity of the transmitter, i.e., determining parameters that accurately describe the non-linear curve of the transmitter, from which digital pre-distortion parameters are derived. The non-linearity of the transmitter can be observed by detecting the output signal of the transmitter to the extent that the non-linearity is reflected in the signal quality of the transmitter output signal.

There are several methods for observing the non-linearity of a transmitter. A first method involves observing the in-band error vector magnitude (EVM) of the transmitter output signal. The non-linear characteristics of the transmitter are reflected in the in-band EVM degradation. A problem with this method is that the signal distortion due to the transmitter non-linearity occurs in the time domain, resulting in amplitude modulation (AM)-AM and AM-phase modulation (PM) distortion. The EVM needs be computed in the time domain in order to correlate the transmitter non-linearity and EVM degradation. Consequently, this method is not feasible for orthogonal frequency division multiple access (OFDMA) or code division multiple access (CDMA) systems where the symbol quality is not readily observed in the time domain. In an OFDMA system, the time domain waveform is converted to a frequency domain waveform from which the symbols are then extracted at the destination device. In a CDMA system, the time domain waveform is de-spread using code correlation techniques, and the symbols are extracted from the de-spread signals at the destination device.

Another method for observing transmitter non-linearity is to observe the out-of-band emissions of transmitter output signal, that is, energy outside the bandwidth of the transmit signal itself. This method relies on the fact that the non-linear characteristics of the transmitter will result in an increase in the out-of-band emissions, known as so-called "spectrum growth". However, in order to implement this technique, the bandwidth of the feedback path from the transmitter output needs to be many times wider than the bandwidth of the transmitter output signal itself in order to observe 3rd and 5th order inter-modulation distortion. Furthermore, the dynamic range of the feedback path needs to be large enough in order to accurately observe higher order inter-modulation distortion. Further still, this method becomes problematic when the transmitter output power level fluctuates with traffic loading and downlink power control.

Accordingly, a better scheme is needed in order to characterize the non-linearity of a transmitter for use in connection with digital pre-distortion compensation techniques.

DESCRIPTION OF EXAMPLE EMBODIMENTS

Overview

Techniques are provided to pre-distort a signal that is transmitted by a transmitter of a wireless communication device, e.g., a device configured for wireless radio frequency communication. The transmitter of the device inherently introduces distortion to the baseband signal to be transmitted. In at least one frame of a baseband signal to be transmitted, at least one subcarrier in a preamble of the frame is shifted in frequency such that the at least one subcarrier is offset from a normal subcarrier frequency position. The at least one frame of the baseband signal is supplied to the transmitter that is configured to produce a transmit signal for transmission. The frequency of one or more subcarriers within the observed portion of the transmit signal are shifted in such a way that their inter-modulation distortion with other subcarriers falls between subcarriers and can be extracted easily from the subcarriers through a Fast Fourier Transform computation. The transmit signal at an output of the transmitter is sampled or detected and inter-modulation distortion in the transmit signal is determined at one or more frequencies as a result of shifting of the frequency of the at least one subcarrier in the preamble of the at least one frame. The baseband signal is pre-distorted based on the inter-modulation distortion prior to coupling to the transmitter for transmission. Multiple observed portions from different frames can be appended together to allow for use of a larger Fast Fourier Transform (FFT) to provide better measurement resolution.

Figure 1:
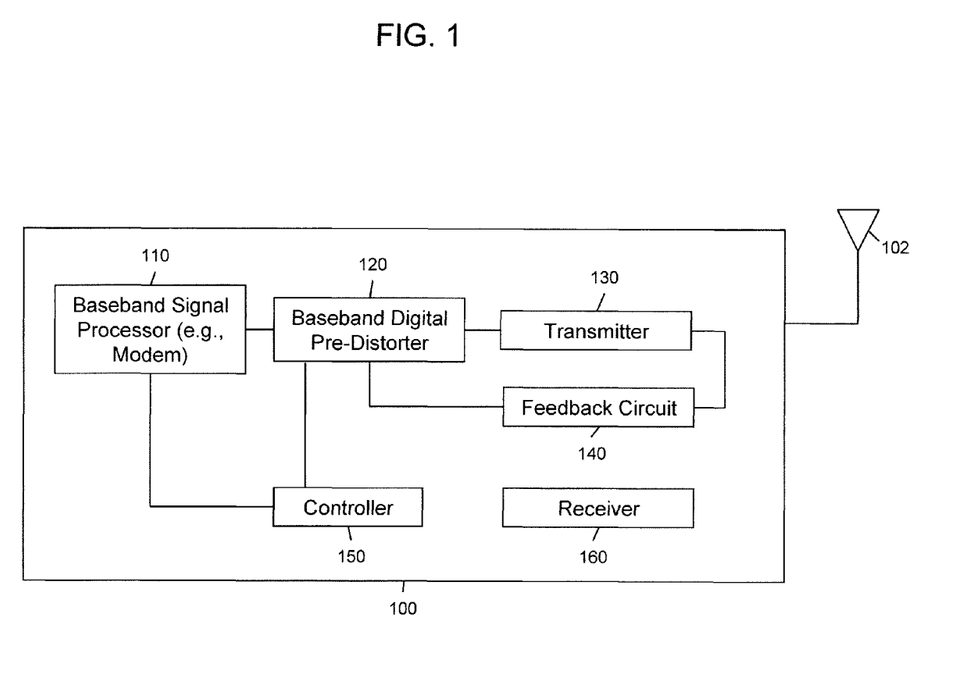
FIG. 1 is an example of a block diagram of a wireless communication device that is configured to characterize a transmitter for digital pre-distortion using offset preamble subcarriers.

Referring first to FIG. 1, a wireless communication device is shown generally at reference numeral 100. The wireless communication device 100 comprises an antenna 102 through which it transmits (and possibly receives) signals. The device 100 comprises a baseband signal processor (e.g., modem) 110, a baseband digital pre-distorter circuit 120, a transmitter 130, a feedback circuit 140 and a controller 150. In addition, the device 100 comprises a receiver 160, though it should be understood that the device may have transmit-only capabilities and to this end the receiver 160 would not be needed in a device configured for transmit-only capabilities.

The baseband signal processor 110 performs the baseband modulation and signal formatting of the baseband signal to be transmitted, hereinafter as the baseband transmit signal. The baseband digital pre-distorter circuit 120 pre-distorts the baseband transmit signal according to pre-distortion parameters that it generates based on observations made on the transmit signal output by the transmitter 130. The feedback circuit 140 supplies a sample of the transmit signal output by the transmitters to the baseband digital pre-distorter circuit 120.

The controller 150 performs higher level control of the device 100, and in this regard, may also perform control functions of the baseband signal processor 110 and the baseband digital pre-distorter circuit 120.

The baseband signal processor 110 may be implemented by a digital signal processor, application specific integrated circuit (ASIC) containing fixed digital logic gates or programmable digital logic gates, a programmable processor that executes functions based on software instructions stored in memory, etc. The baseband digital pre-distorter circuit 120 may be implemented in a similar manner. Furthermore, the functions of the baseband signal processor 110 and the baseband digital pre-distorter circuit 120 may be integrated into the same component (e.g., same ASIC).

Figure 2:
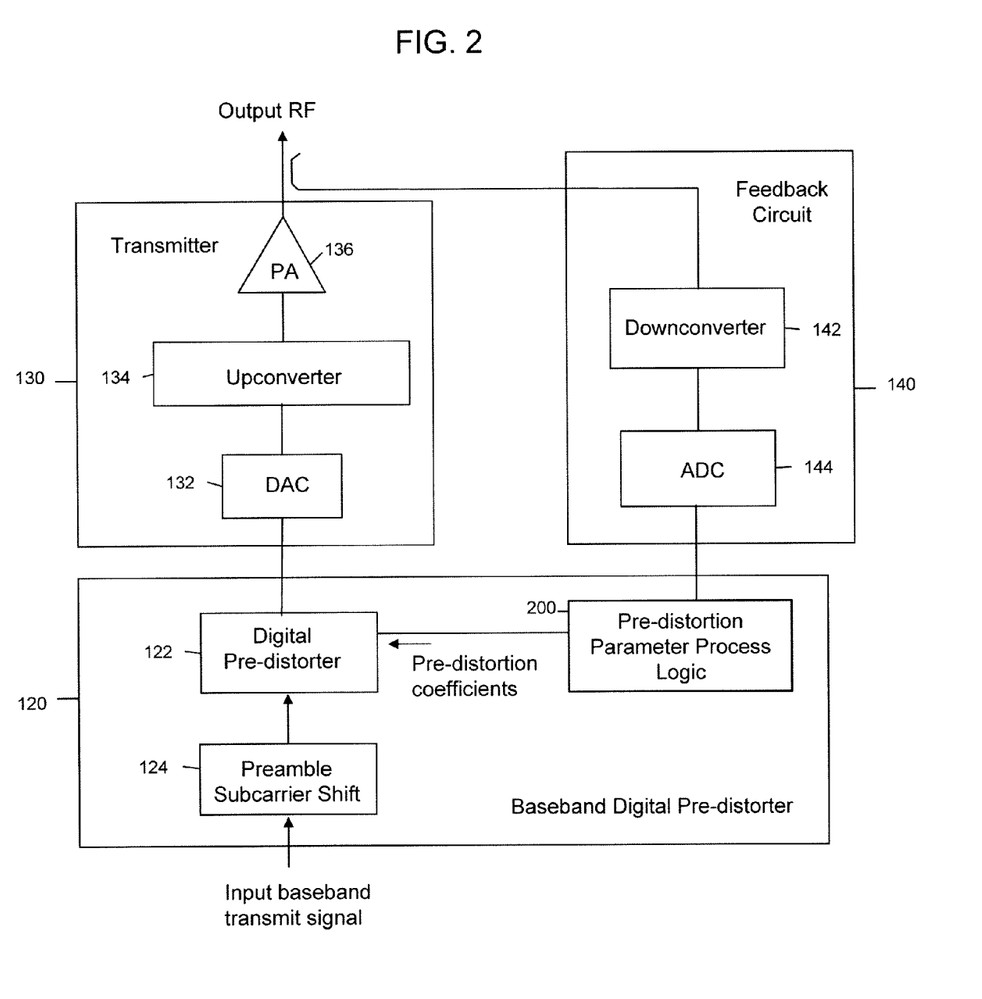
FIG. 2 is a more detailed block diagram of components in the wireless communication device that are configured to characterize a transmitter for digital pre-distortion using offset preamble subcarriers.

Reference is now made to FIG. 2 for a more detailed description of the baseband digital pre-distorter circuit 120, the transmitter 130 and the feedback circuit 140. The description of FIG. 2 begins with the transmitter 130. The transmitter 130 comprises a digital-to-analog converter (DAC) 132, an upconverter 134 and a power amplifier (PA) 136. The DAC 132 converts a digital baseband pre-distorted transmit signal supplied as input to the transmitter 130 from the digital pre-distorter circuit 120 to an analog signal. The upconverter 134 upmixes the analog signal to the desired transmission frequency, e.g., a radio frequency (RF) carrier frequency, and the upconverted signal is then coupled to the power amplifier 136 that amplifies it to produce a transmit signal for transmission via the antenna 102 (FIG. 1).

The feedback circuit 140 is configured to sample the transmit signal at the output of the PA 136 of the transmitter 130, by tapping the output of the PA 136 and coupling it to a downconverter 142. The downconverter 142 is configured to downconvert the sampled transmit signal back to baseband (from its upconverted transmission frequency) and supplies the baseband sampled transmit signal to an analog-to-digital converter (ADC) 144. The ADC 144 converts the analog baseband sampled transmit signal to a digital sampled baseband transmit signal that is then supplied to the baseband digital pre-distorter circuit 120.

The baseband digital pre-distorter circuit 120 comprises a digital pre-distorter block 122, a preamble subcarrier shift block 124 and pre-distortion parameter process logic 200. The baseband digital pre-distorter circuit 120 receives as input the digital sampled baseband transmit signal from the feedback circuit 140 and the baseband transmit signal from the baseband signal processor 110. The preamble subcarrier shift block 124 shifts the frequencies of at least one preamble subcarrier. The logic 200 measures inter-modulation distortion (IMD) in the digital baseband sampled transmit signal and computes pre-distortion parameters which are supplied to the digital pre-distorter block 122. The digital pre-distorter block 122 uses the pre-distortion parameters to pre-distort the baseband transmit signal before it is supplied to the transmitter 130 for transmission. The preamble subcarrier shift block 124 and logic 200 are described in detail hereinafter with reference to FIG. 7.

Figure 3:
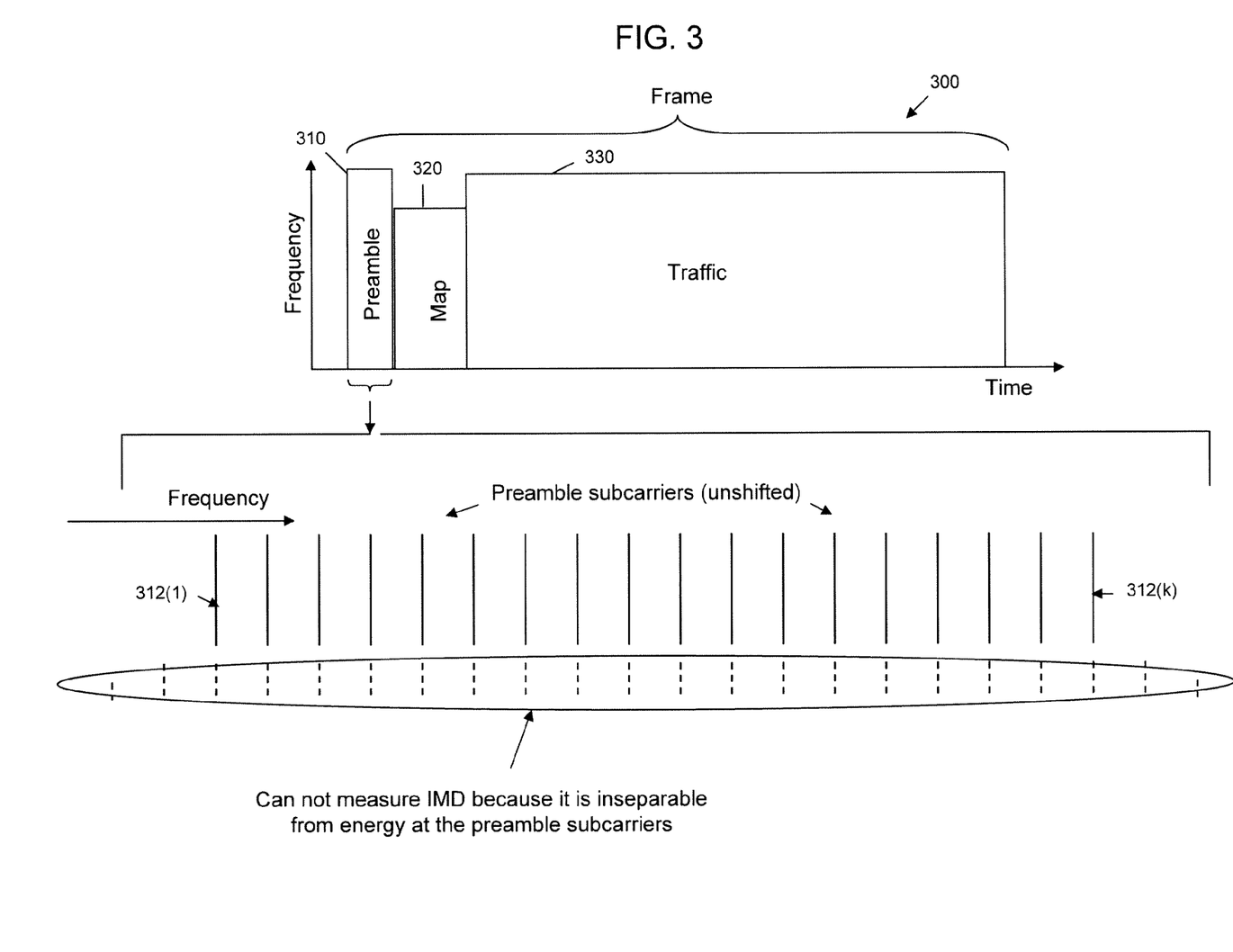
FIG. 3 is a timing diagram of a frame of a baseband transmit signal and illustrating the difficulty in measuring inter-modulation distortion when the preamble subcarriers are not offset.

Reference is now made to FIG. 3 for a description of the motivation for the preamble subcarrier shifting technique referred to above that is performed by the preamble subcarrier shift 124 block in the baseband digital pre-distorter circuit 120. FIG. 3 shows a timing diagram for a waveform or frame 300 of a signal to be transmitted, and in this example, this timing diagram is for a 5 MHz downlink signal formatted for a WiMAX™ communication system. The frame 300 comprises time intervals for a preamble 310, a map 320 and traffic 330. The preamble is present in all frames and with constant power. The duration of the map 320 varies depending on traffic loading of the frame. For example, only a small portion of the carriers may be used in the map 320 for a particular frame. The power level of the traffic 330 varies according to loading and forward power control parameters. Thus, the preamble 310 is better suited for observing characteristics of the transmit signal since it is subject to less variability as compared to other intervals of the frame 300.

However, as shown in FIG. 3, the preamble 310 comprises a plurality of subcarriers 312(1)-321(k) that are distributed evenly over a bandwidth. Consequently, any IMD caused by non-linearity of the transmitter 130 will fall at the same positions as the desired subcarriers present in the preamble 310, thus making energy from the IMD and energy at the desired subcarriers inseparable or indistinguishable unless IMD is observed at unoccupied subcarriers.

Figure 4:
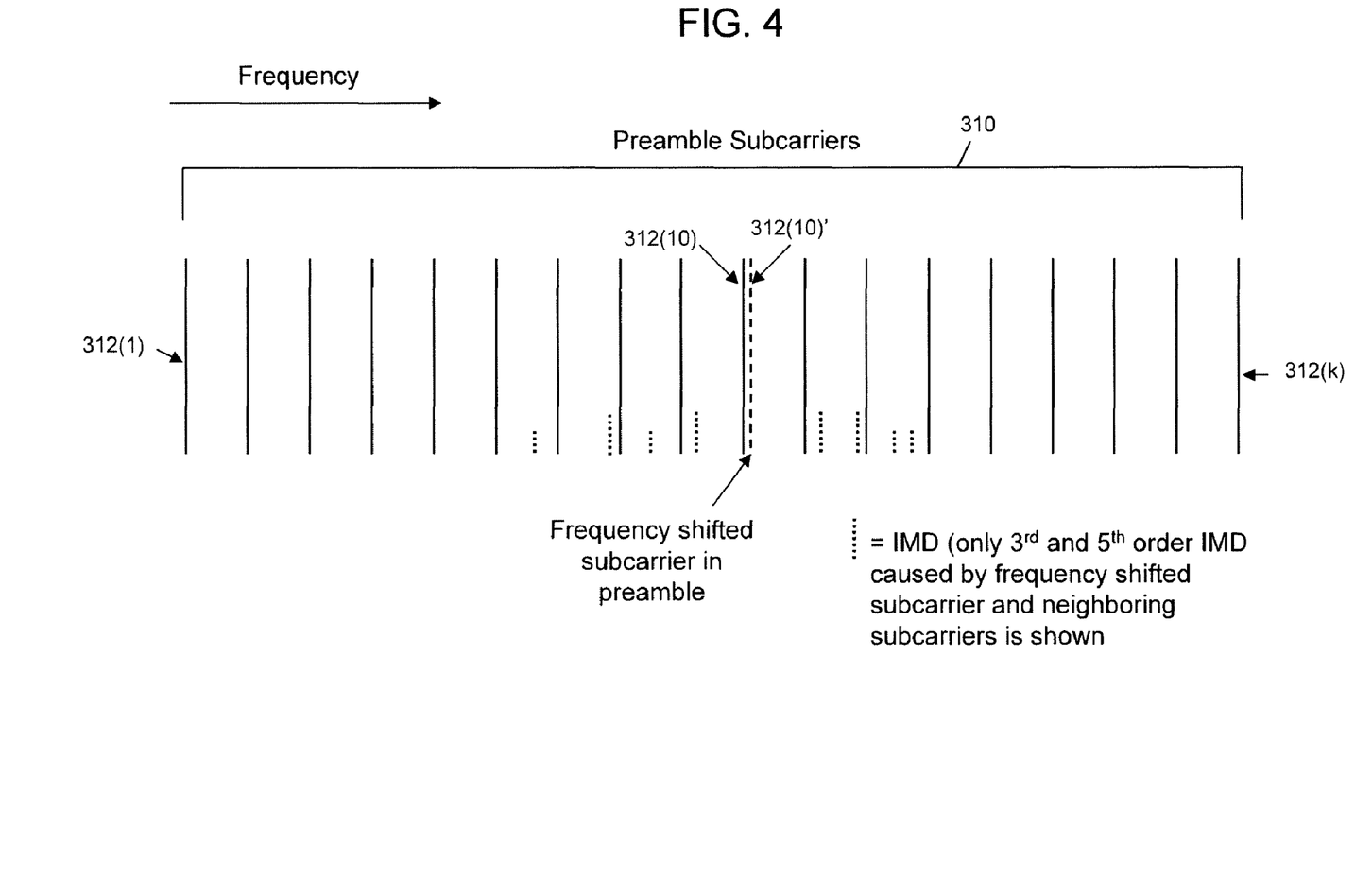
FIG. 4 is a diagram of a preamble of a frame of a baseband transmit signal and illustrating shifting of at least one preamble subcarrier.

Turning now to FIG. 4, a technique is shown in which the preamble subcarrier shift block 124 of the baseband digital pre-distorter circuit 120 slightly shifts one or more subcarriers in the preamble 310 are shifted to overcome the issue raised in connection with FIG. 3. To alleviate the issue where the IMD is inseparable from energy at a preamble subcarrier, the frequency of one or more subcarriers in the preamble 310 is shifted slightly such that at least one subcarrier is offset from a normal subcarrier frequency position by a fraction of the preamble subcarrier spacing. FIG. 4 shows this by way of example for subcarrier 312(10) that is shifted to a slightly higher frequency as shown at 312(10)'. The IMD that may result from the shifted or offset subcarrier 312(10)' is shown by the dotted lines in FIG. 4, and it is evident from FIG. 4 that the IMD associated with subcarrier 321(10)' does not overlap or coincide in frequency with any other subcarriers of the preamble.

Figure 5:
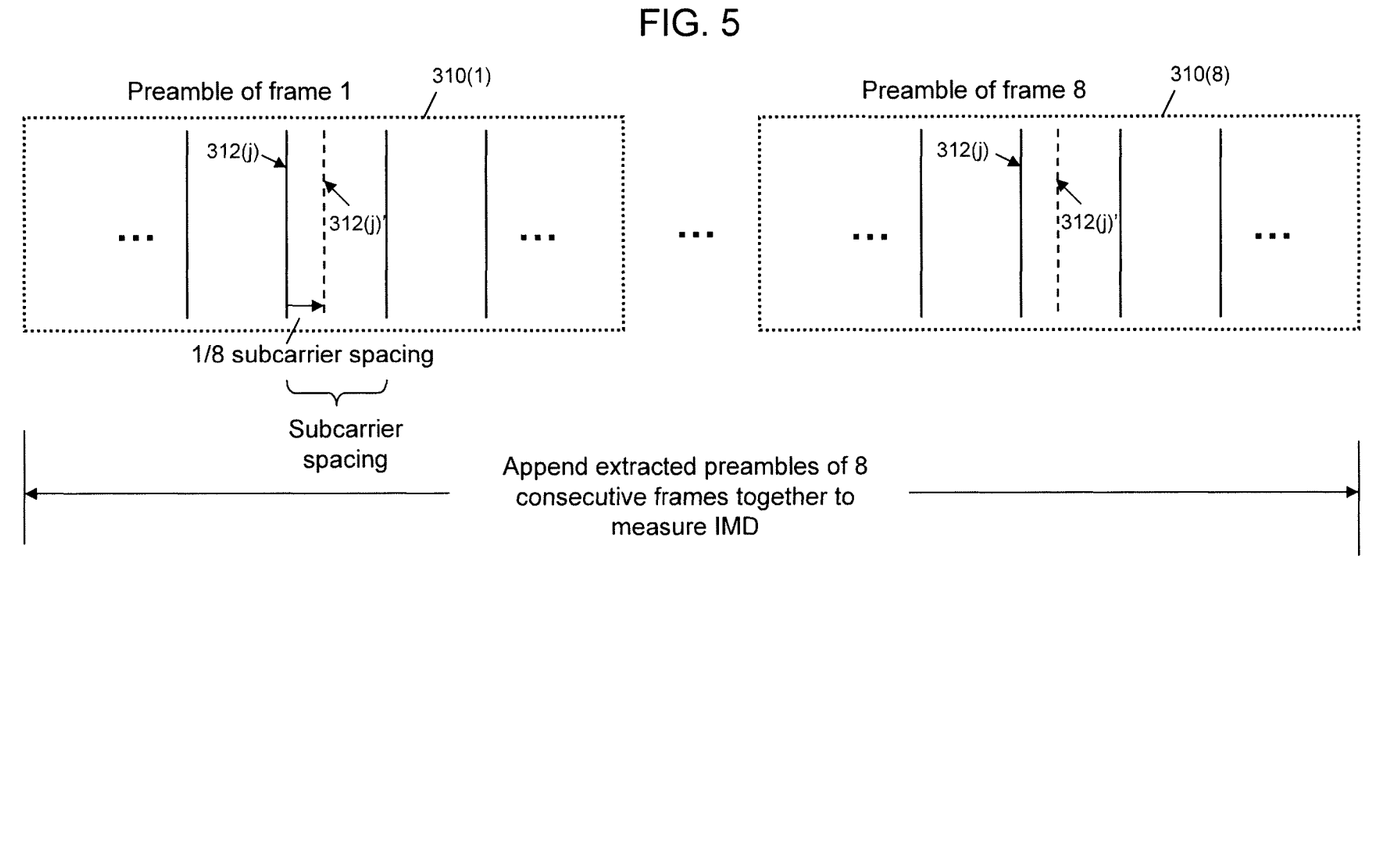
FIG. 5 is a diagram illustrating one example of a preamble subcarrier frequency shifting scheme for a preamble of multiple successive frames of a baseband transmit signal.

Turning to FIG. 5, a more detailed example is shown for shifting a subcarrier in a preamble, again, the function performed by the preamble subcarrier shift block 124 of the baseband digital pre-distorter circuit 120. FIG. 5 shows the preambles of multiple frames, e.g., eight frames, where preamble 310(1) is the preamble for frame 1, . . . , and preamble 310(8) is the preamble for frame 8. In this example, the preambles 310(1)-310(8) are for eight successive frames, though it should be understood that the preambles need not be for immediately consecutive frames as there could be intervening frames (not shown). However, in one form, the frames in which the preambles have at least one shifted subcarrier are immediately consecutive frames. In the preambles for each of these frames, at least one subcarrier is shifted or offset in frequency by a small amount. In this example, the subcarrier that is chosen for the shift is a middle subcarrier $312(j)$, that is, a subcarrier in the middle of the bandwidth or spectrum of subcarriers used in the preamble. The shifted subcarrier is denoted $312(j)'$ in the preambles 310(1)-310(8) in FIG. 5. The amount of frequency shift applied to the at least one preamble subcarrier may vary. In the example shown in FIG. 5, the frequency shift is to the right (to a greater frequency) by ⅛ of the preamble subcarrier spacing. The frequency shift could also be the left (to a lesser frequency). By shifting the frequency of at least one subcarrier as shown in FIG. 5, the IMD associated with energy at this shifted subcarrier and its neighboring subcarriers can easily be distinguished from the energy at the neighboring subcarriers.

As shown in FIG. 5, at least one preamble is shifted in a plurality of successive frames and when these frames are coupled through the feedback circuit 140 to the baseband digital pre-distorter 130, the IMD is determined from the preambles for plurality of frames appended together. That is, the baseband digital pre-distorter 130 analyzes the IMD associated with the preamble across the plurality of successive (and perhaps immediately consecutive) frames to determine an overall measurement of IMD of the transmit signal. More specifically, the preambles extracted from multiple frames are appended together to enable use of a larger FFT size. For example, as shown in FIG. 5, if the middle subcarrier is shifted to the right in frequency by ⅛ subcarrier spacing, the preambles from 8 frames can be extracted and appended together and an 8*512/3 FFT may be used (for better IMD measurement resolution), in the case of 5 MHz WiMAX signal, for example. This subcarrier shifting and preamble appending scheme ensures that all the IMD and preamble subcarriers fall on the FFT grids, thereby avoiding any inter-carrier-interference (ICI).

Figure 6:
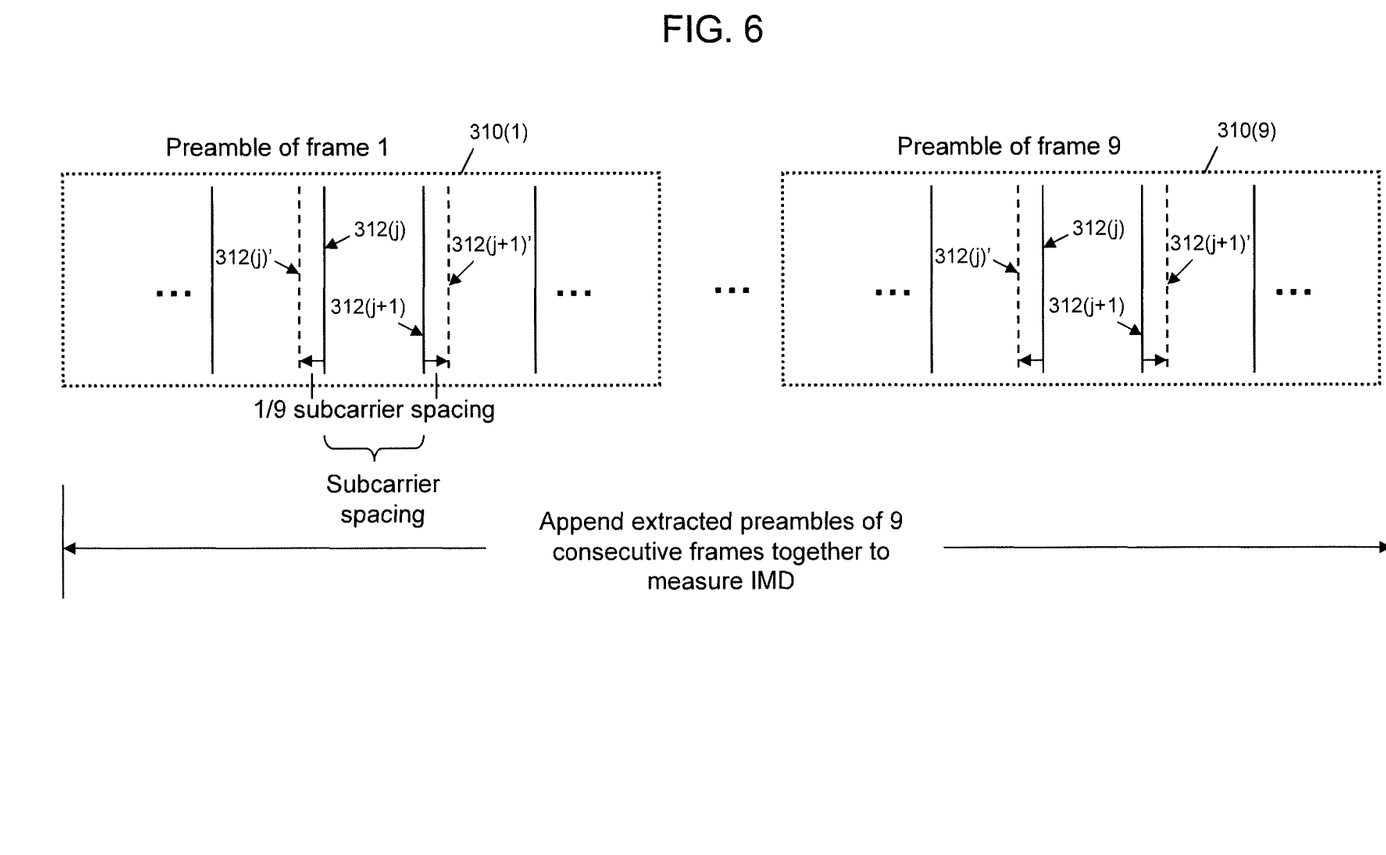
FIG. 6 is a diagram illustrating another example of a preamble subcarrier frequency shifting scheme for a preamble of multiple successive frames of a baseband transmit signal.

FIG. 6 illustrates an example of another preamble subcarrier shifting scheme performed by the preamble subcarrier shift block 124 of the baseband digital pre-distorter circuit 120. In this scheme, multiple subcarriers in a preamble of a frame are shifted. For example, middle subcarriers $312(j)$ and $312(j+1)$ are shifted. Moreover, the subcarriers are shifted in opposite directions. That is, subcarrier $312(j)$ is shifted to the left and subcarrier $312(j+1)$ is shifted to the right. In the example of FIG. 6, there are nine frames shown in which the preambles have the shifted subcarriers. The middle two subcarriers $312(j)$ and $312(j+1)$ are shifted (in opposite directions) by ⅛ of the preamble subcarrier spacing. Consequently, a 1.5 k FFT (9*512/3=1.5 k FFT) can be used for purposes of analyzing from IMD from the preambles of nine successive frames.

As is known in the art, the preamble is used to provide time and frequency reference for a destination communication device with respect to a source communication device. In many communication systems, such as WiMAX, there are numerous subcarriers in the preamble. For example, in a 5 MHz WiMAX signal, there are 143 subcarriers in the preamble. Consequently, shifting one or a few subcarriers in a preamble of several frames will have negligible impact on system performance.

In summary, FIGS. 5 and 6 show examples of preamble subcarrier shifting schemes that involve shifting a frequency of at least one middle subcarrier of a preamble by a fraction of the subcarrier spacing of the preamble. The scheme shown in FIG. 5 involves shifting the frequency of at least one middle subcarrier by a fraction 1/x of the subcarrier spacing in each of x successive preambles in the baseband signal. The scheme in FIG. 6 involves shifting a frequency of each of two middle subcarriers in opposite directions by a fraction 1/y of the subcarrier spacing in each of y successive preambles in the baseband signal.

Figure 7:
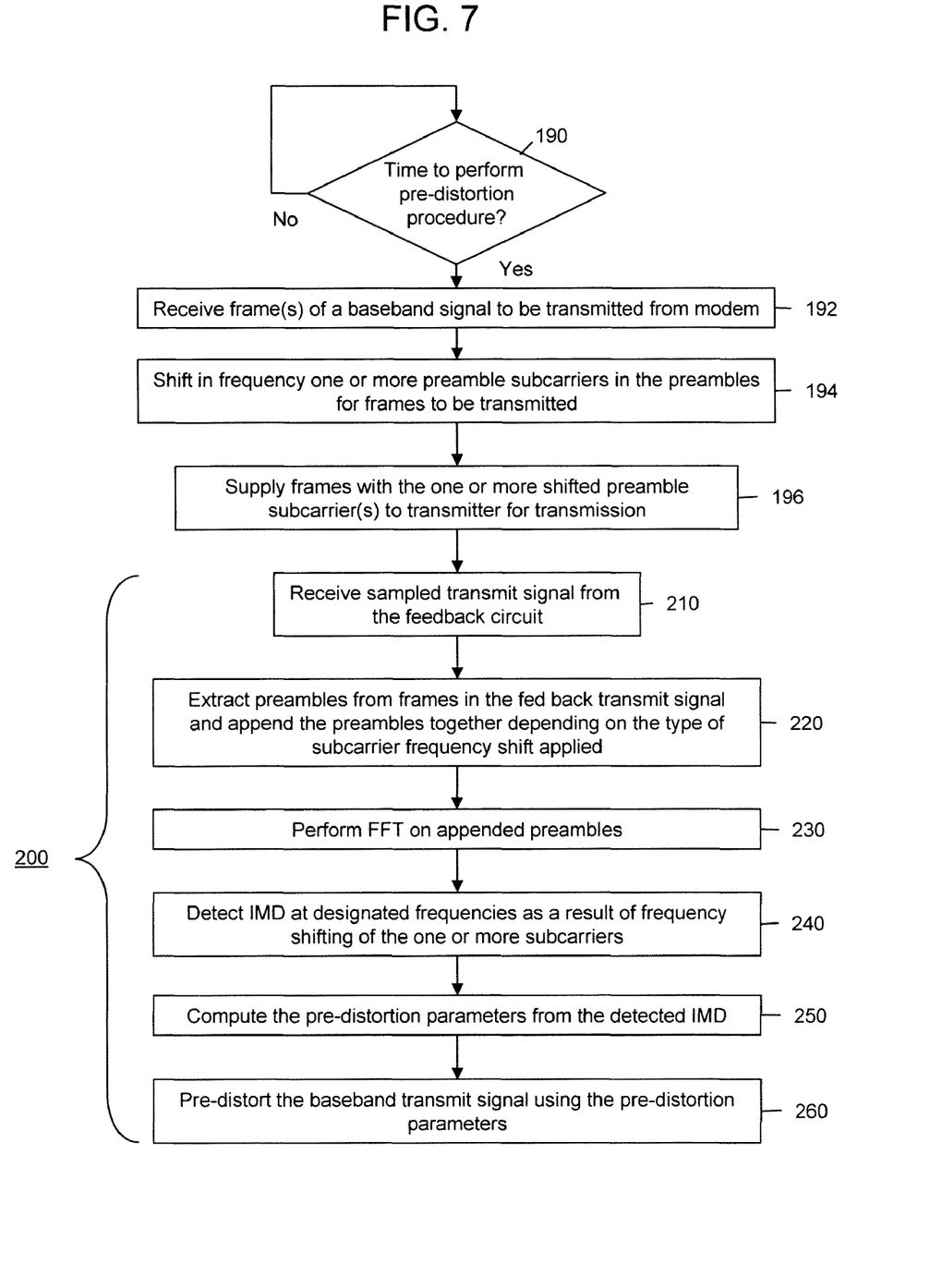
FIG. 7 is an example of a flow chart for logic associated with a preamble subcarrier shift and pre-distortion parameter process that is performed in the wireless communication device.

Turning now to the flow chart of FIG. 7, functions of the preamble subcarrier shift block 124 and pre-distortion process logic 200 of the baseband digital pre-distorter circuit 120 are now described. As explained the preamble subcarrier shift block 124 and the logic 200 may be implemented by fixed or programmable digital logic gates, or in software encoded in a memory medium, that when executed by a processor, causes a processor to perform the functions described herein. Thus, in general, the preamble subcarrier shift block 124 and the logic 200 may be encoded in one or more tangible media (fixed or programmable digital logic gates, of memory) for execution and when executed operable to perform the functions described herein. Reference is also made to FIG. 2 in connection with the description of the flow chart in FIG. 7.

As indicated at 190, the functions shown in FIG. 7 associated with the preamble subcarrier shift block 124 and the logic 200 may be executed on a periodic basis, for example every N frames, where N is configurable. Alternatively, these functions may be executed on an on-demand basis in response to a system administrator command, for example. In either case, when these functions are performed, at 192 the baseband transmit signal from the baseband signal processor (modem) 110 is received into the baseband digital pre-distorter circuit 120. At 194, the preamble subcarrier shift block 124 shifts one or more preamble subcarriers in frequency in the preamble of frames to be transmitted. For example, the preamble shifting schemes shown in FIGS. 5 or 6 may be employed at 194. At 196, the frames with the one or more shifted preamble subcarriers are supplied (through the digital pre-distorter 122 with no or some initial pre-distortion parameters applied thereto) to the transmitter 130 for transmission. The transmitter 130 upconverts the frames of the baseband transmit signal (with the one or more shifted preamble subcarriers) to output a transmit signal.

Now, at 210 the process logic 200 begins. At 210, the transmit signal output by the transmitter 130 is captured/sampled by the feedback circuit 140 and coupled as input to the baseband digital pre-distorter circuit 120. At 220, the preambles from frames of the sampled transmit signal (digital baseband sampled transmit signal) are extracted and the preambles from multiple frames of the transmit signal are appended together depending on the type of preamble subcarrier shift scheme applied. For example, if the scheme of FIG. 5 is employed, then the preambles of eight frames are extracted and appended together, whereas if the scheme of FIG. 6 is employed, then the preambles of nine frames are extracted and appended together. At 230, an FFT operation is performed on the appended preambles obtained at 230. Then, at 240, the energy at the various subcarrier frequencies and frequencies off-set from the subcarrier frequencies is analyzed to detect IMD as a result of the shifting of the frequency of one or more preamble subcarriers. At 250, the pre-distortion parameters are computed from the IMD determined at 240. In one form, the pre-distortion parameters are computed using an algorithm that models the distortion characteristics of the transmitter, determined from a prior analysis of the transmitter. At 260, an incoming baseband transmit signal is then pre-distorted by the digital pre-distorter 122 according to the pre-distortion parameters computed at 250.

Figure 8:
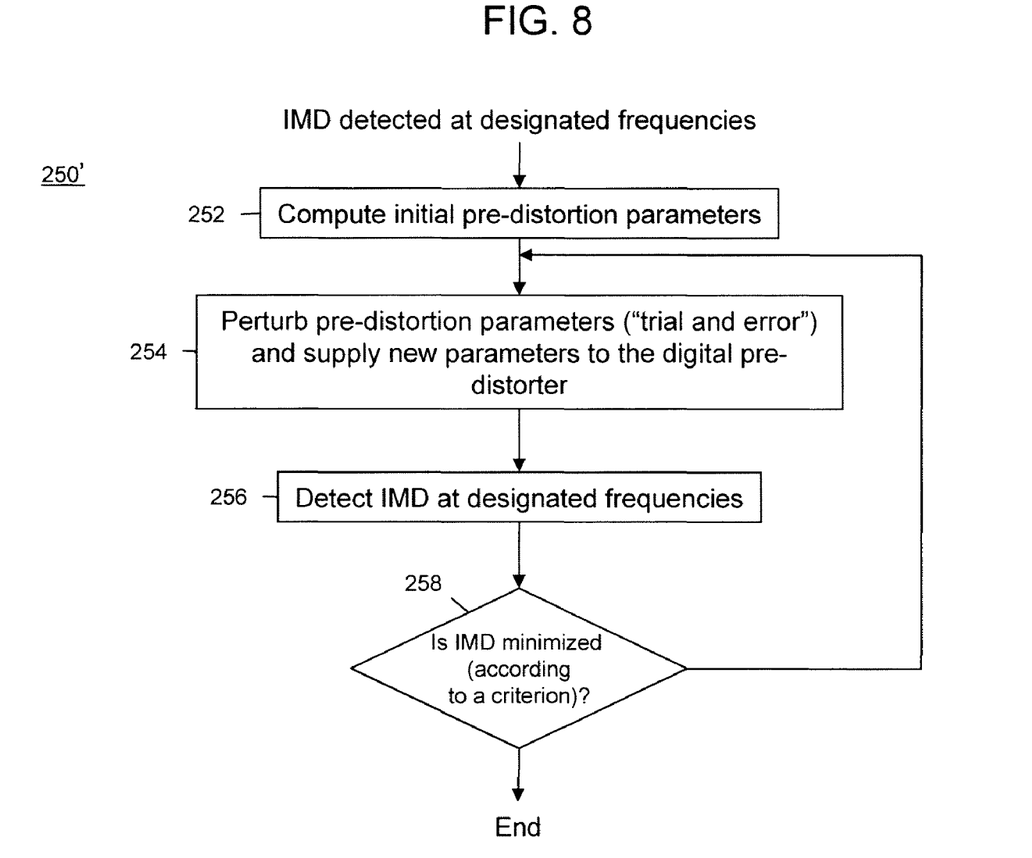
FIG. 8 is an example of a flow chart illustrating another technique for computing pre-distortion parameters.

FIG. 8 illustrates another way to compute the pre-distortion parameters at function 250, shown at 250'. The function 250' involves an optimization procedure that makes adjustments to the pre-distortion parameters until the IMD is minimized according to a predetermined criterion or criteria. At 252, the IMD detected at 240 is used to compute initial pre-distortion parameters. At 254, the initial pre-distortion parameters are perturbed (adjusted) to produce "new" parameters that are supplied to the pre-distorter 122 that pre-distorts an incoming baseband transmit signal accordingly. The baseband transmit signal is also subjected to the preamble shifting scheme described above. At 256, after the transmit signal is output by the transmitter, it is fed back to baseband digital pre-distorter and IMD is detected. At 258, the IMD detected at 256 is compared with a predetermined criterion or criteria and when this criterion or criteria is met, the function 250' is said to be completed. The most recent or "new" pre-distortion parameters computed at 284 are then used to pre-distort the baseband transmit signal. The predetermined criterion employed at 258 may be whether a level of the IMD detected at 256 is below the desired in-band signal level by a certain value, i.e. 40 dB, or a whether the IMD level does not change over multiple iterations.

There are numerous techniques known (and likely hereinafter developed) that may be employed to detect the IMD and compute pre-distortion parameters. One known technique is disclosed in commonly assigned co-pending U.S. Patent Publication No. 2007/0129027, entitled "Method and System to Improve Transmitter Linearization." According to this technique, the response curve of a transmitter 110 can be approximated by the following polynomial:

$$V_{out} = G_v \cdot V_{in} \cdot \left[ 1 + \sum_{i=1}^{N} A_i \cdot (V_{in})^{2i} + \sum_{i=1}^{N} B_i \cdot (V_{in})^{2i-1} \right],$$

where $V_{out}$ and $V_{in}$ are the output and input signals of the transmitter 110, respectively, $G_v$ is the small signal gain (linear gain). In this equation, only odd-term coefficients $A_i$ can be characterized by measuring the IMD. The even-term coefficients $B_i$ are unknown and cannot be measured and are therefore ignored. The coefficients $A_i$ of the odd terms in the polynomial that approximate the response curve of the transmitter 10 can be calculated according to the following equation:

$\{m_{ij}\}*\{A_j\}=\{F_i\}$, $i=1, \ldots NF$, $j=0, \ldots N$; $NF \Rightarrow N$, where $m_{ij}=FFT\{(b_{in})^{2j+1}\}|f_i$ and $F_i=FFT\{(b_{out})\}|f_i$, where $FFT\{\}|f_i$ means FFT evaluation at preamble subcarrier frequency $f_i$, $(b_{in})$ is the input stream associated with a preamble or preambles from multiple frames (with one or more preamble subcarriers shifted in frequency) sent to the transmitter 110 and $(b_{out})$ is the input stream associated with a preamble or preambles from multiple frames appended together derived from the digital baseband sampled transmit signal produced by the feedback circuit 140.

The response curve of the digital pre-distorter 122 can be approximated by the following polynomial:

$$V'_{in} = V_{in} \cdot \left[ 1 + \sum_{j=1}^{N} a_j \cdot (V_{in})^{2j} \right],$$

where $V'_{in}$ is the output of the digital pre-distorter and $V_{in}$ is the input to the digital pre-distorter 122, and $a_j$ are the pre-distortion coefficients of the polynomial approximating the response curve of the digital pre-distorter 122. The pre-distortion coefficients $a_j$ are examples of the pre-distortion parameters referred to above.

The preamble subcarrier offset techniques to enable characterization of a transmitter described herein may be applied to any multi-carrier wireless communication system, such as any system that uses orthogonal frequency division multiple access (OFDMA) techniques.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   receiving a baseband signal to be transmitted, wherein the baseband signal comprises at least one frame;
   shifting in frequency at least one subcarrier in a preamble of the frame such that the at least one subcarrier is offset from a normal subcarrier frequency position;
   supplying the at least one frame to a transmitter that is configured to produce a transmit signal for transmission;
   detecting the transmit signal at an output of the transmitter;
   determining inter-modulation distortion in the transmit signal at one or more frequencies as a result of shifting of the frequency of the at least one subcarrier in the preamble of the at least one frame; and
   pre-distorting the baseband signal prior to coupling to the transmitter for transmission based on the inter-modulation distortion.

2. The method of claim 1, and further comprising computing pre-distortion parameters from the inter-modulation distortion, wherein pre-distorting comprises pre-distorting the baseband signal according to the pre-distortion parameters.

3. The method of claim 2, wherein shifting comprises shifting at least one subcarrier in the preambles of each of a plurality of successive frames in the baseband signal, and wherein determining comprises determining the inter-modulation distortion for preambles of the plurality of frames appended together.

4. The method of claim 3, wherein shifting comprises shifting a frequency of at least one middle subcarrier of the preamble by a fraction of a subcarrier spacing of the preamble.

5. The method of claim 3, wherein shifting comprises shifting a frequency of at least one middle subcarrier by a fraction 1/x of the subcarrier spacing in each of x successive preambles in the baseband signal.

6. The method of claim 3, wherein shifting comprises shifting a frequency of each of two middle subcarriers in opposite directions by a fraction 1/y of the subcarrier spacing in each of y successive preambles in the baseband signal.

7. The method of claim 2, wherein computing comprises computing the pre-distortion parameters using an algorithm that models distortion characteristics of the transmitter.

8. The method of claim 2, wherein computing comprises computing initial pre-distortion parameters from the inter-modulation distortion, pre-distorting comprises pre-distorting the baseband signal using the initial pre-distortion parameters, determining comprises determining inter-modulation distortion for a transmit signal transmitted by the transmitter using the initial pre-distortion parameters, wherein computing further comprises computing new pre-distortion parameters based on the inter-modulation distortion determined for use of the initial pre-distortion parameters, and wherein said pre-distorting, determining and computing are repeated until pre-distortion parameters are computed that minimize the inter-modulation distortion according to a predetermined criterion.

9. The method of claim 1, wherein the preamble comprises a plurality of subcarriers and wherein shifting in frequency the at least one subcarrier in a preamble of the frame comprises:
   shifting in frequency the at least one subcarrier such that the frequency position of one or more other subcarriers of the plurality of subcarriers is unaffected.

10. An apparatus comprising:
a transmitter that is configured to receive as input a baseband pre-distorted transmit signal to be transmitted and to produce as output a transmit signal for transmission at a transmission frequency;
a feedback circuit that is configured to be connected to the transmitter and to sample the transmit signal output by the transmitter and to produce a digital sampled baseband transmit signal; and
a baseband digital pre-distorter circuit that is configured to receive as input the digital sampled baseband transmit signal and a baseband transmit signal and to produce the baseband pre-distorted transmit signal by pre-distorting the baseband transmit signal based on inter-modulation distortion determined in the digital sampled baseband transmit signal, wherein the baseband digital pre-distorter circuit is configured to shift in frequency at least one subcarrier in a preamble of a frame of the baseband transmit signal such that the at least one subcarrier is offset from a normal subcarrier frequency position and to determine the inter-modulation distortion in the digital sampled baseband transmit signal at one or more frequencies as a result of the shifting of the frequency of the at least one subcarrier in the preamble of at least one frame of the baseband transmit signal.

11. The apparatus of claim 10, wherein the baseband digital pre-distorter circuit is configured to shift at least one subcarrier in the preambles of each of a plurality of successive frames in the baseband transmit signal and to determine the inter-modulation distortion for preambles of the plurality of frames appended together.

12. The apparatus of claim 11, wherein the baseband digital pre-distorter circuit is configured to shift a frequency of at least one middle subcarrier of the preamble by a fraction of a subcarrier spacing of the preamble.

13. The apparatus of claim 11, wherein the baseband digital pre-distorter circuit is configured to shift at least one middle subcarrier by a fraction 1/x of the subcarrier spacing in each of x successive preambles in the baseband signal.

14. The apparatus of claim 11, wherein the baseband digital pre-distorter circuit is configured to determine initial pre-distortion parameters from the inter-modulation distortion, pre-distort the baseband transmit signal using the initial pre-distortion parameters, determine inter-modulation distortion for the transmit signal transmitted by the transmitter using the initial pre-distortion parameters, determine new pre-distortion parameters based on the inter-modulation distortion determined for use of the initial pre-distortion parameters, repeat determining new pre-distortion parameters until pre-distortion parameters are computed that minimize the inter-modulation distortion according to a predetermined criterion.

15. Logic encoded in one or more tangible media for execution and when executed operable to:
receive a baseband signal to be transmitted, wherein the baseband signal comprises at least one frame;
shift in frequency at least one of a plurality of subcarriers in a preamble of the frame such that the at least one subcarrier is offset from a normal subcarrier frequency position and such that the frequency position of one or more other subcarriers of the plurality of subcarriers is unaffected;
supply the at least one frame to a transmitter that is configured to produce a transmit signal for transmission;
detect the transmit signal at an output of the transmitter;
determine inter-modulation distortion in the transmit signal at one or more frequencies as a result of shifting of the frequency of the at least one subcarrier in the preamble of the at least one frame; and
pre-distort the baseband signal prior to coupling to the transmitter for transmission based on the inter-modulation distortion.

16. The logic of claim 15, and further comprising logic that is configured to compute pre-distortion parameters from the inter-modulation distortion, wherein the logic that pre-distorts is configured to pre-distort the baseband signal according to the pre-distortion parameters.

17. The logic of claim 16, wherein the logic that computes is configured to compute initial pre-distortion parameters from the inter-modulation distortion, and wherein the logic that pre-distorts is configured to pre-distort the baseband signal using the initial pre-distortion parameters, the logic that determines is configured to determine inter-modulation distortion for a transmit signal transmitted by the transmitter using the initial pre-distortion parameters, and further comprising logic that is configured to compute new pre-distortion parameters based on the inter-modulation distortion determined for use of the initial pre-distortion parameters, and wherein the logic that pre-distorts, determines the inter-modulation distortion and computes the pre-distortion parameters is configured to repeat until pre-distortion parameters are computed that minimize the inter-modulation distortion according to a predetermined criterion.

18. The logic of claim 15, wherein the logic that shifts is configured to shift at least one subcarrier in the preambles of each of a plurality of successive frames in the baseband signal, and wherein the logic that determines the inter-modulation distortion comprises logic that determines the inter-modulation distortion for preambles of the plurality of frames appended together.

19. The logic of claim 18, wherein the logic that shifts is configured to shift a frequency of at least one middle subcarrier of the preamble by a fraction of a subcarrier spacing of the preamble.

20. The logic of claim 18, wherein the logic that shifts is configured to shift a frequency of at least one middle subcarrier by a fraction 1/x of the subcarrier spacing in each of x successive preambles in the baseband signal.

21. The logic of claim 18, wherein the logic that shifts is configured to shift a frequency of each of two middle subcarriers in opposite directions by a fraction 1/y of the subcarrier spacing in each of y successive preambles in the baseband signal.

* * * * *